(12) United States Patent
Allsop et al.

(10) Patent No.: US 8,006,434 B2
(45) Date of Patent: Aug. 30, 2011

(54) ADJUSTABLE GARDEN STAKE

(75) Inventors: James D. Allsop, Bellingham, WA (US); Eivind Clausen, Bellingham, WA (US)

(73) Assignee: Allsop, Inc., Bellingham, WA (US)

( * ) Notice: Subject to any disclaimer, the term of this patent is extended or adjusted under 35 U.S.C. 154(b) by 83 days.

(21) Appl. No.: 12/517,621

(22) PCT Filed: Dec. 7, 2007

(86) PCT No.: PCT/US2007/086844
§ 371 (c)(1),
(2), (4) Date: Jun. 4, 2009

(87) PCT Pub. No.: WO2008/070855
PCT Pub. Date: Jun. 12, 2008

(65) Prior Publication Data
US 2010/0005715 A1    Jan. 14, 2010

Related U.S. Application Data

(60) Provisional application No. 60/873,867, filed on Dec. 7, 2006.

(51) Int. Cl.
*A01G 17/14* (2006.01)
(52) U.S. Cl. .......................................................... 47/47
(58) Field of Classification Search ................ 47/47, 42, 47/44; D8/1; 248/156
See application file for complete search history.

(56) References Cited

U.S. PATENT DOCUMENTS

| | | | | |
|---|---|---|---|---|
| 903,686 A * | 11/1908 | Devany | ............................ | 52/150 |
| 1,129,838 A * | 3/1915 | Allen | ................................ | 47/47 |
| 1,549,274 A * | 8/1925 | Lewis | ................................ | 47/47 |
| 1,911,979 A * | 5/1933 | Vaars, Jr. et al. | ................... | 47/47 |
| 2,851,823 A * | 9/1958 | Peterson | ............................ | 47/47 |
| 2,968,850 A * | 1/1961 | Tinnerman | .................... | 403/397 |
| 4,096,662 A | 6/1978 | Anderson | | |
| 4,333,264 A * | 6/1982 | Smrt | ................................ | 47/42 |
| D292,475 S * | 10/1987 | Kitchen | ............................ | D8/1 |
| 4,703,584 A * | 11/1987 | Chazalnoel | ....................... | 47/46 |
| 5,052,086 A | 10/1991 | Nasuno | | |
| 5,263,279 A * | 11/1993 | Delsanne et al. | ................. | 47/70 |
| D433,886 S * | 11/2000 | Wolter, Jr. | .......................... | D8/1 |
| 6,434,883 B1 | 8/2002 | Martin | | |
| 6,702,239 B2 * | 3/2004 | Boucher | ........................ | 248/156 |
| D489,588 S * | 5/2004 | Hall | .................................. | D8/1 |
| 6,938,370 B2 | 9/2005 | Johns | | |
| 7,020,998 B1 * | 4/2006 | Kirkland et al. | ................... | 47/47 |
| D600,079 S * | 9/2009 | Wolf | ................................. | D8/1 |
| 2006/0042160 A1 | 3/2006 | Lipkin | | |
| 2010/0005715 A1 * | 1/2010 | Allsop et al. | ....................... | 47/47 |

FOREIGN PATENT DOCUMENTS

| | | | | |
|---|---|---|---|---|
| CH | 676905 A5 * | 3/1991 | ......................... | 47/47 |
| GB | 2241143 A * | 8/1991 | | |

* cited by examiner

*Primary Examiner* — Francis T Palo
(74) *Attorney, Agent, or Firm* — Black Lowe & Graham PLLC

(57) ABSTRACT

A stake for insertion in soil to support an item such as a plant. The stake includes primary and secondary telescoping shafts and a foot adjustably secured to the primary shaft. The primary shaft has an upper end and a lower end. The lower end is configured for insertion into the soil at a first location. The foot has a supporting protrusion for insertion into the soil at a second location removed from the first location. Retractable ties are disposed within the secondary shaft and may be extended to support a plant. An adjustable collar may provide an anchor point for additional support.

19 Claims, 6 Drawing Sheets

ADJUSTABLE GARDEN STAKE

PRIORITY CLAIM

This application is a National Phase Entry of PCT/US07/86844 filed on Dec. 7, 2007, which claims priority to U.S. Provisional Patent Application No. 60/873,867 filed Dec. 7, 2006.

FIELD OF THE INVENTION

The present invention relates generally to garden stakes for supporting plants and, more particularly, to adjustable garden stakes that have a support member to surround a plant.

BACKGROUND OF THE INVENTION

Garden stakes are commonly used to support growing plants. Most are simple, straight support members, such as bamboo stakes. String can be used to support a plant next to the stake. Stakes have improved upon this simple example to include support wires to surround a plant. Multiple upright support members joined with hoops have also been employed and may be especially useful for fruit or vegetable bearing plants, such as tomatoes. However, as a plant grows the support needs may change. Furthermore a single stake size may not accommodate all plant sizes and support concerns.

SUMMARY OF THE INVENTION

The deficiencies in the currently available stakes are overcome in the present invention, providing a stake for insertion in soil to support an item such as a plant. The stake includes a primary shaft and a foot adjustably secured to the primary shaft. The primary shaft has an upper end and a lower end. The lower end is configured for insertion into the soil at a first location. The foot has a supporting protrusion for insertion into the soil at a second location removed from the first location. The foot is adjustable for translation along at least a portion of the primary shaft.

Preferably, the foot is slidably coupled to the exterior of the primary shaft. The foot is translatable along the primary shaft while the supporting protrusion maintains a substantially parallel orientation relative to the lower end of the primary shaft.

In one preferred embodiment, the foot includes a quick-release fastener coupled to the primary shaft. The quick-release fastener includes a leaf-spring clamp having at least one hole for engagement of the primary shaft. The clamp is biased into an angled relationship with respect to the primary shaft for securement thereto.

In a further aspect of the invention, the foot includes a sleeve fixed to the supporting protrusion. The sleeve has an inner size slightly larger than an outer size of at least a portion of the primary shaft. The sleeve is slideably engaged to the primary shaft and positioned adjacent the leaf spring.

In a further aspect of the invention, the foot includes a support member substantially transverse to the lower end of the primary shaft. The support member extends between the primary shaft and the supporting protrusion.

In another aspect of the invention, the sleeve that is secured to the primary shaft for slidable engagement therewith is cylindrical with an axis along a longitudinal axis of the primary shaft. The foot is rotatable about the primary shaft while maintaining the relative orientation of the supporting protrusion relative to the lower end of the primary shaft.

The stake of the present invention may also be defined as including a primary shaft, a secondary shaft, and a clamp. The primary shaft includes a soil engaging lower portion and a hollow upper portion. The secondary shaft is telescopically secured within the upper, hollow portion of the primary shaft. The clamp is secured between the primary shaft and the secondary shaft. The clamp is formed of a plate spring formed with at least one bend and having a first opening. The first opening engages the primary shaft. A second opening engages the secondary shaft. The bend in the plate spring is disposed between the first and second openings.

In one preferred aspect of the invention both the primary and secondary shafts comprise hollow cylindrical tubes.

In one embodiment of the invention, the plate spring includes a first portion and a second portion. The first opening in the plate spring is disposed through the first portion. The first portion is angled downwardly from the bend, generally toward the soil engaging lower portion. The second opening is disposed through the second portion. The second portion is angled generally upwardly opposite the first portion.

In an alternate embodiment, the first portion of the plate spring is angled generally upwardly from a bend while a second portion is angled generally downwardly. In such an embodiment preferably two bends and a backing portion spacing the two bends are used between the first and second portions of the spring plate.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
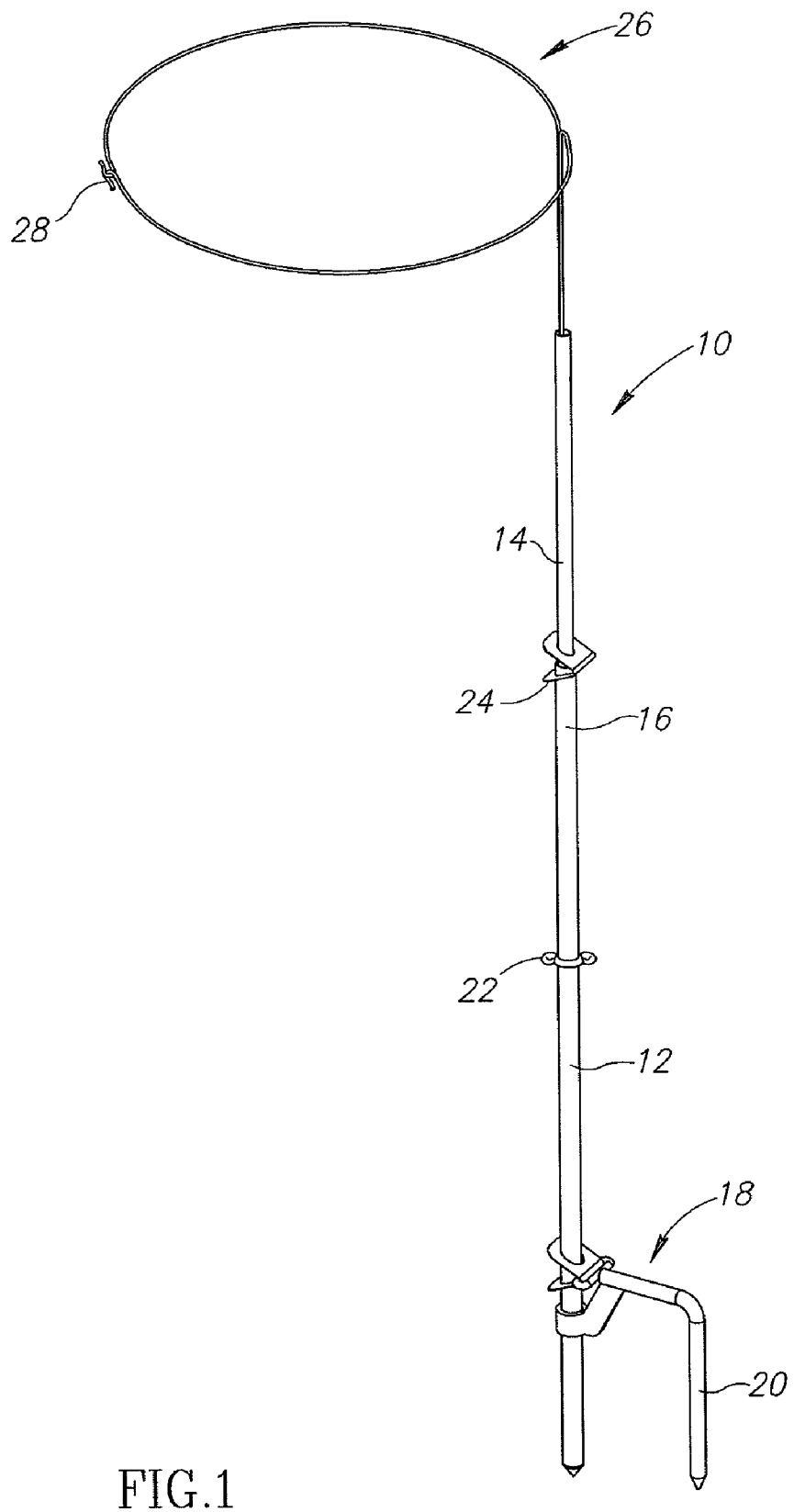
FIG. 1 is an isometric view of the assembled stake.

As shown in FIG. 1, the present invention provides a garden stake 10 configured to hold up and support plants. In a preferred embodiment, it adjusts four different ways to accommodate the many varieties of plants as well as planting soils, which are not currently adequately accommodated with common garden stakes found in the horticulture today. Each adjustment means accomplishes its function in an intuitive, easy manner.

In one embodiment, the stake is constructed of at least two independent lengths of material, such as metal, composite, or wood. Preferably aluminum or steel tubes telescope relative to each other in order to change the length of the overall stake. A primary shaft 12 is formed of a first, larger diameter outer tube. A secondary shaft 14 is formed of a second, smaller diameter tube that telescopes within an upper end 16 of primary shaft 12. The stake also incorporates a slidably adjustable foot 18 that provides a secondary supporting protrusion 20 into the soil to support the main stake body. It also has a slidably adjustable rubber like collar 22 that serves as a secondary anchor point for a string, lace, rope or strap that supports the plant's lower portion.

One desirable configuration of the stake utilizes one or more upper members (secondary shaft 14) adjustable and fixable to the lower member (primary shaft 12) of the stake 10 by employing two or more telescoping tubes using a unique leaf spring clamp 24 that when squeezed will allow adjustment of one tube relative to the others and thereby changing the overall length of the stake 10. For example clamp 24 can be squeezed to release secondary shaft 14 for telescopically adjusting the positioning of secondary shaft 14 relative to primary shaft 12.

Figure 2:
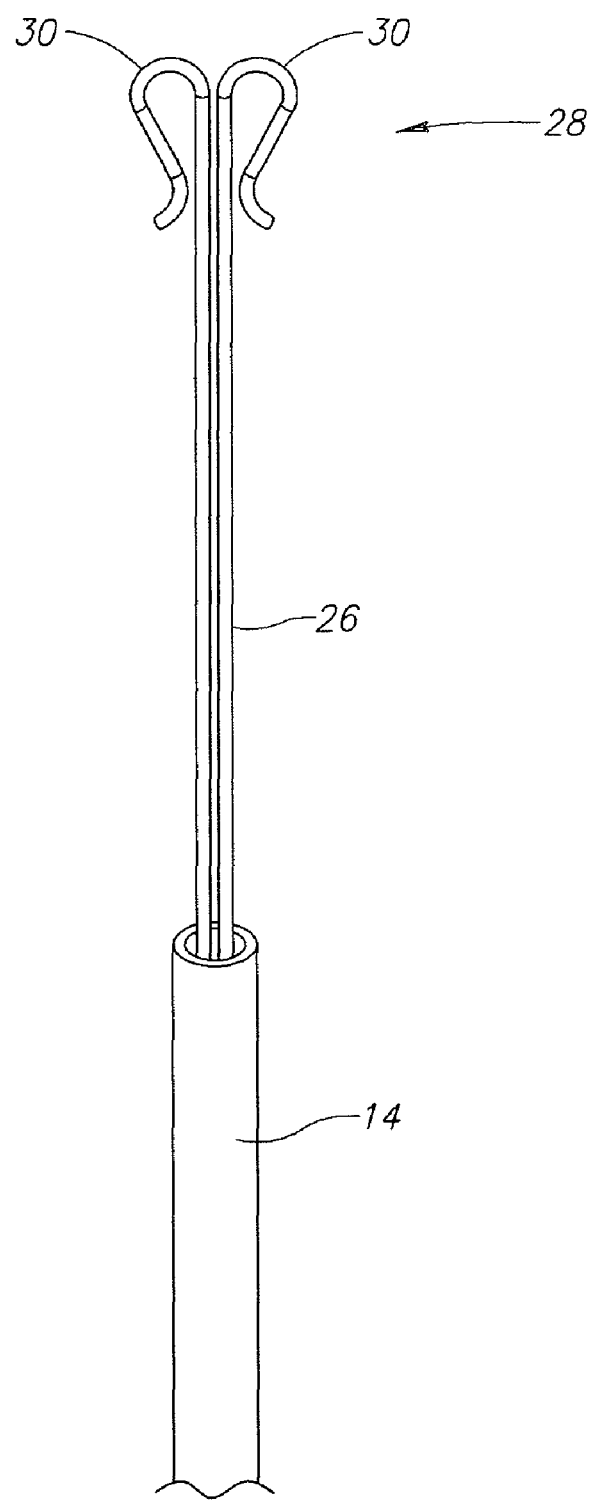
FIG. 2 is a an isometric view of the upper portion of the stake showing the retractable ties partially extended.
Figure 3:
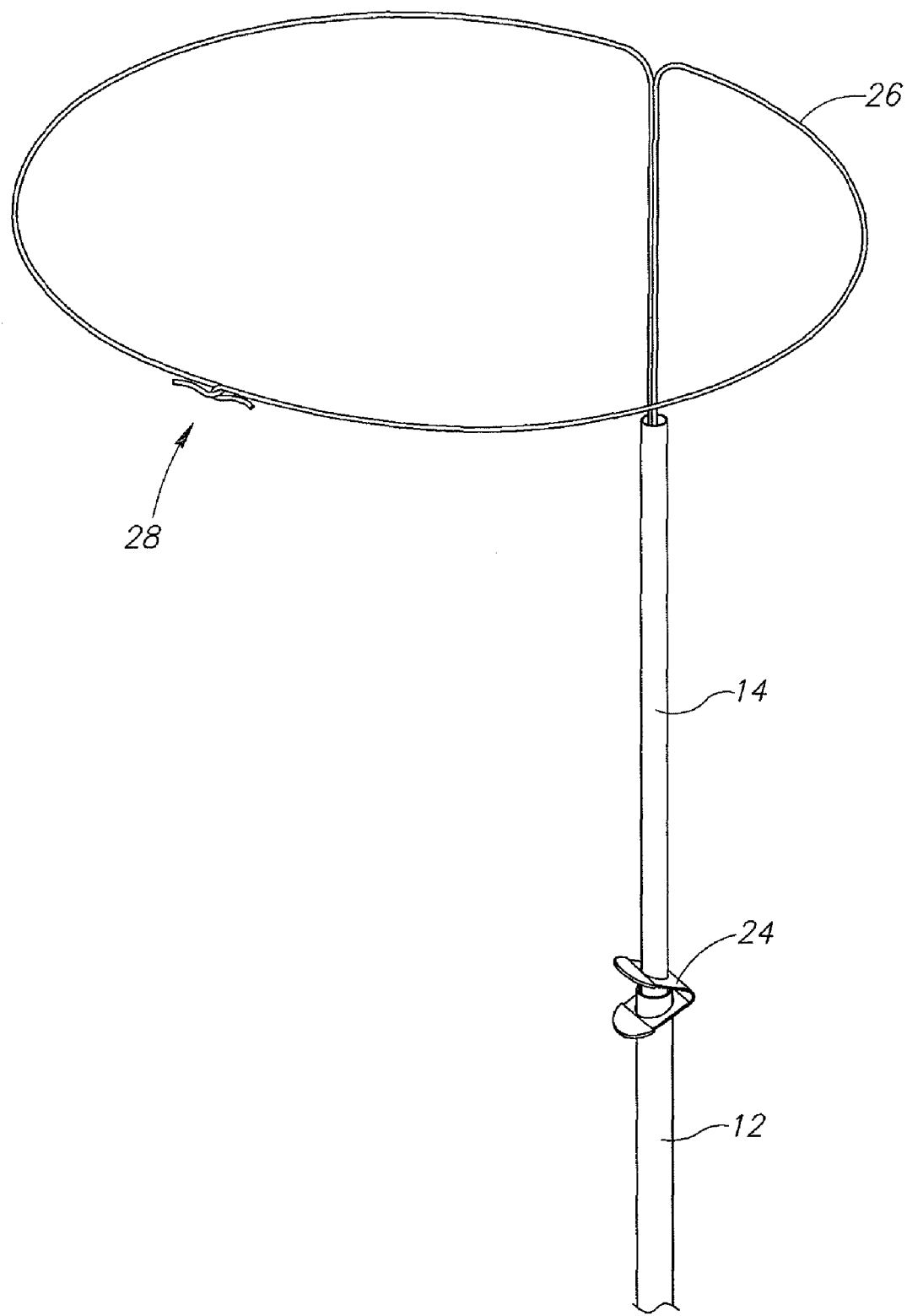
FIG. 3 is an isometric view of the upper portion of the stake showing the retractable ties extended and formed into a hoop.

The upper most tube (secondary shaft 14) being hollow allows for two flexible but spring like wires, retractable ties 26, to reside inside the tube but be extended out and bent to form a closed hoop that is made possible by a connection means (tie couplers 28). See FIGS. 2 and 3. One such means could be comprised of two inter-locking hooks 30 formed into the wire ends.

The degree to which the hoop wires (retractable ties 26) are extended from their normal resting spot inside the tube (secondary shaft 14) determines how big the hoop can be made and therefore what breadth of plant can be enveloped or supported by the hoop.

The adjustable telescoping metal or composite tubes with bent metal leaf spring clamp 24 are punched with precise holes that align themselves when the leaf spring clamp is squeezed, freeing the tubes from their locked position and allowing them to slide relative to each other for height adjustment. Note that the spring tension on the edges of the precise holes in the spring clamp causes the spring to "bite" into the outer side walls of the tubing when the clamp is left in its normally engaged position. This serves as an inexpensive and simple friction lock.

Figure 4:
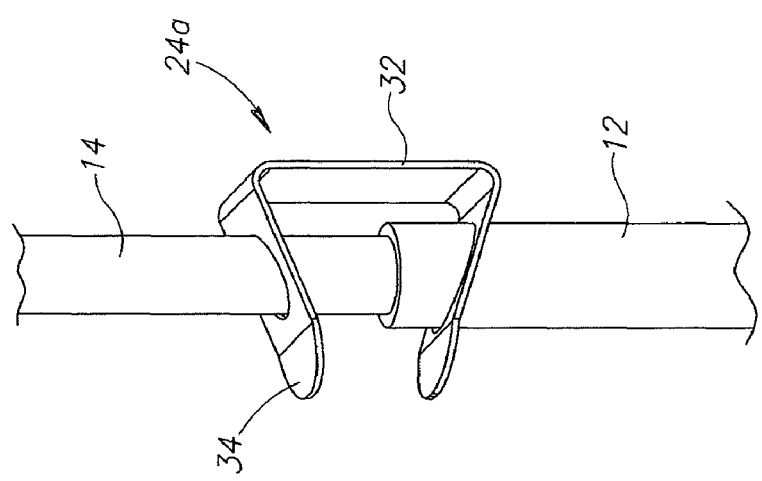
FIG. 4 is a partial isometric view of a mid-portion of the stake showing a clip between the shafts.

In one alternate embodiment, shown in FIG. 4, a double-bent spring clip is used for clamp 24a. In this embodiment, the downward force on secondary shaft 14 will further tighten the locking hold between primary shaft 12 and secondary shaft 14. Clamp 24a is preferably constructed from a bent plate of spring steel material. A backing plate 32 extends between tabs 34. To adjust the secondary shaft position, a tab 32 on the end of clamp 24a is lifted, relieving the locking pressure. Secondary shaft 14 can then be pushed into primary shaft 12. Lifting of secondary shaft 14 relative to primary shaft 12 can be accomplished without pulling on clamp 24a. Alternate arrangements are foreseen, including a link from the top of primary shaft 12 to a plate with a hole through which secondary shaft 14 extends and locks with downward force.

Figure 5:
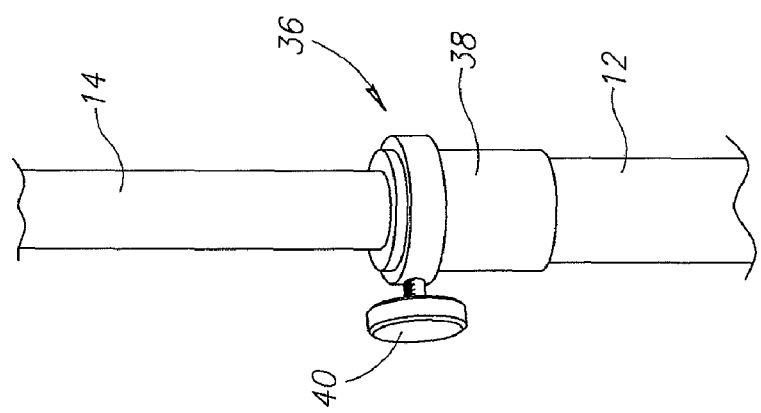
FIG. 5 is a partial elevational view of a mid-portion of the stake showing a screw clamp.

A further alternate fastener to secure primary shaft 12 relative to secondary shaft 14 is shown in FIG. 5. Screw lock 36 includes a sleeve 38 sized to engage the top of primary shaft 12 and a mid-portion of secondary shaft 14. It includes a thumb screw 40 threaded into sleeve 38 to engage and lock the position of secondary shaft 14 relative to primary shaft 12.

Figure 6:
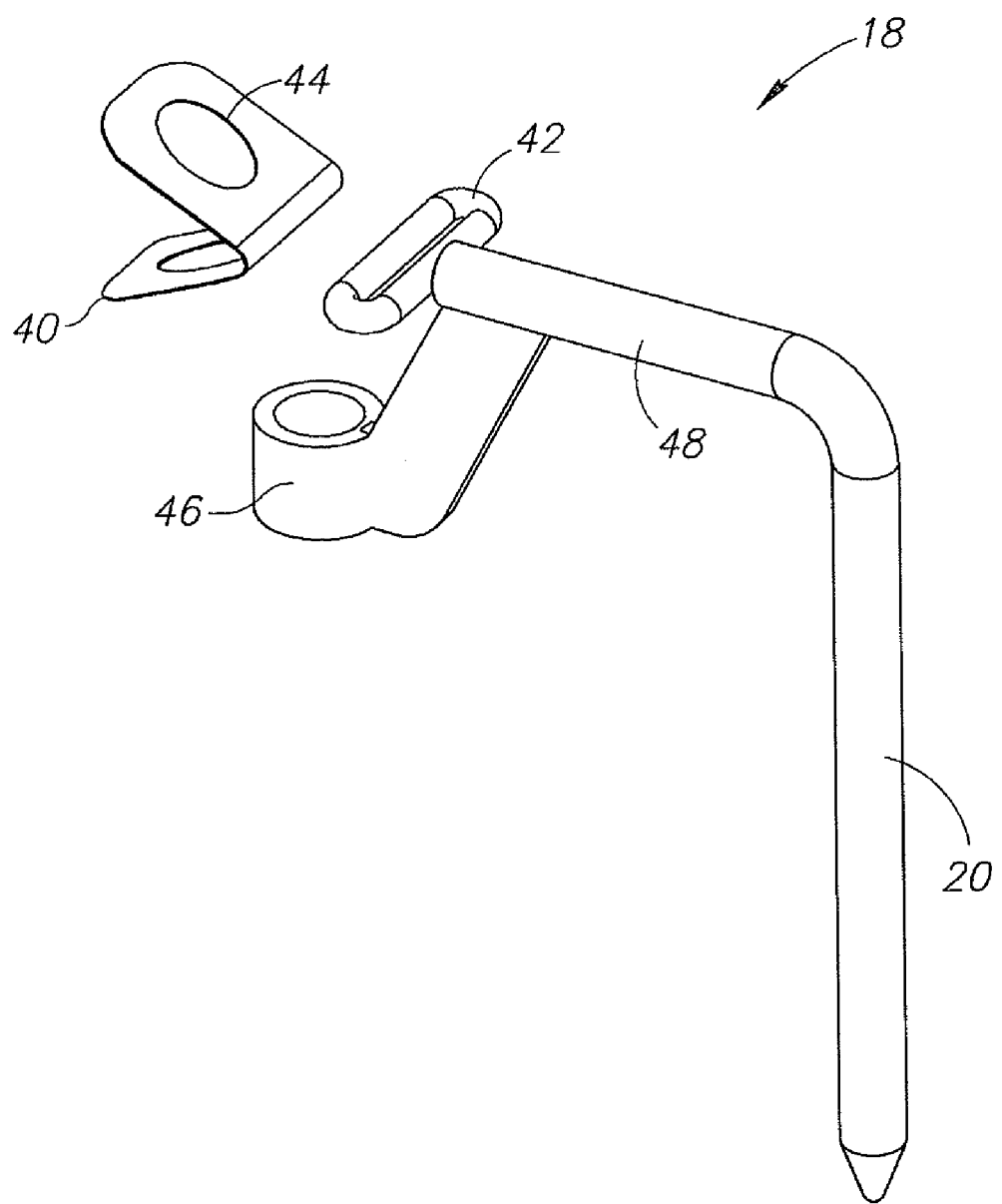
FIG. 6 is an isometric exploded view of the foot member.
Figure 7:
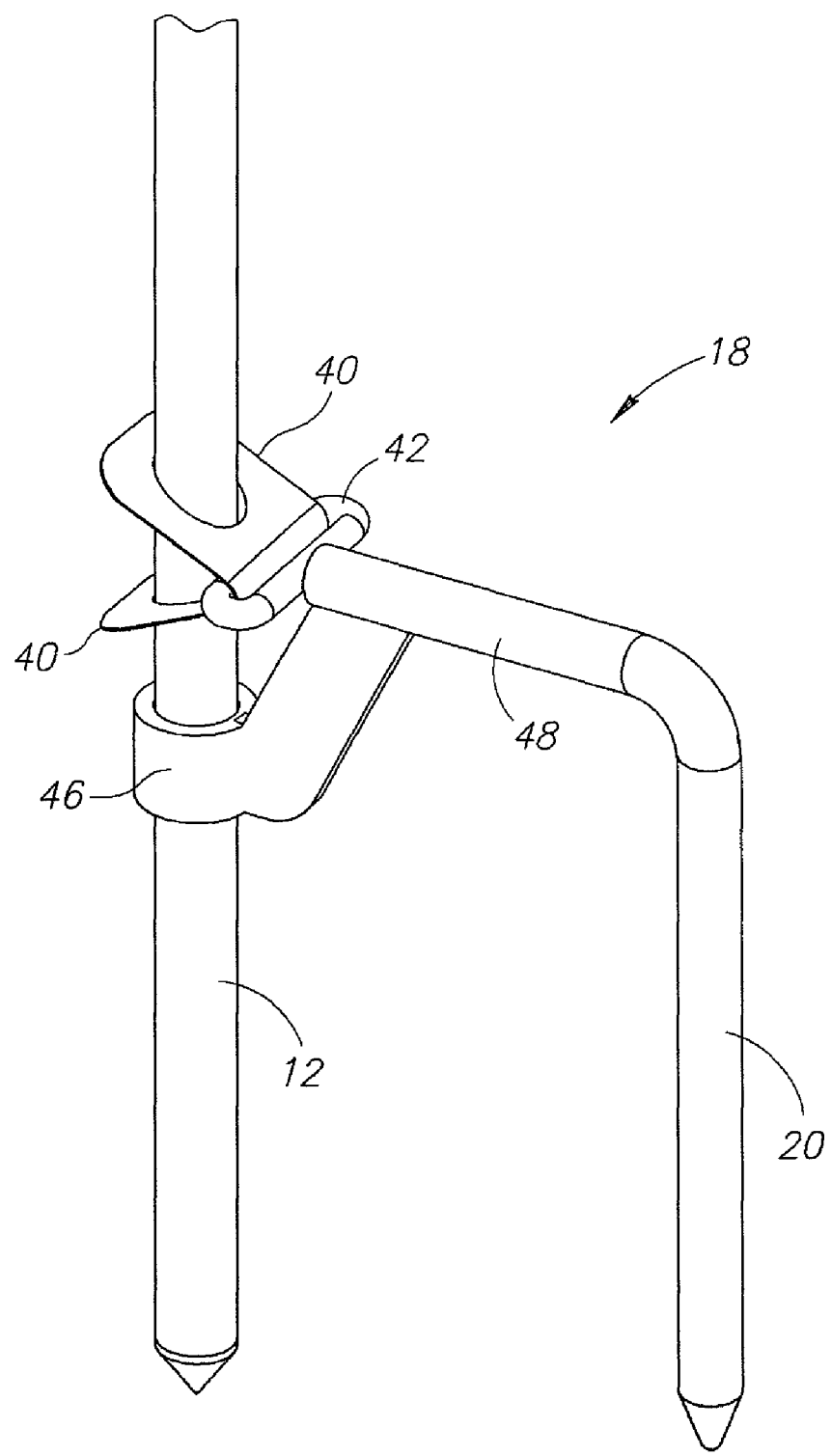
FIG. 7 is an isometric view of the lower end of the stake with the foot member engaged.

Referring to FIGS. 6 and 7, the secondary adjustable stake foot 18, once entrenched into the ground with the primary stake shaft 12, supports the main stake itself. It slides into position along the primary stake shaft 12 and serves as a footrest to allow the user's body weight to help drive the stake 10 and the stake foot 18 into the ground in the same motion. It also serves as a hand hold in order to pull the stake 10 out of the ground. It is uniquely adjustable along the length of the lower member (primary shaft 12) of the stake 10 so that its position can be changed for the optimum plant support position, either raised for soft soil conditions (allowing deeper penetration of the lower end of primary shaft 12) or lowered for hard soil conditions. It can also be pivoted 360 degrees around the stake body which means it can be oriented in the best direction to counter the tilting force (lean) caused by the weight of the plant.

The mechanism for locking the foot to the main shaft is unique in that it makes use of a simple leaf spring clamp (foot clamp 40) used to adjust the position of the foot 18 relative to the stake 10. Thus a quick-release fastener is created. The clamp is fed through a hoop 42 in the foot 18 and then the shaft 12 is guided through holes 44 in the clamp so that it pulls on the shaft 12 in two places which spreads the load on the stake shaft when the stake is to be driven into the ground. The lower portion of the stake foot has a loop (sleeve 46) formed in it which the shaft tube passes through allowing the foot to guide on the shaft while being adjusted. This triangulating configuration also is very effective in reducing the bending movement on the stake shaft when force is applied during insertion of the stake into the soil.

Note that this configuration divides the load between the two halves in the metal leaf spring clip (clamp 40) also contributing to the minimization of the bending movement on the shaft as well as not overstressing the leaf spring clip during stake insertion.

Foot hoop 42 is secured to supporting protrusion with support member 48, extending generally transverse to supporting protrusion 20. Support member 48 provides a convenient place to push the lower end of primary shaft 12 and supporting protrusion 20 into the soil. It is also useful to pull stake 10 from the ground.

As seen in FIG. 1, the adjustable collar 22 serves as an anchor point for another enclosure around the lower portion of the plant. Its friction adjustment along the shaft (either primary or secondary shafts 12 or 14) aids in positioning it in the best place for a string, rope, strap, or lace to envelope the plants lower portion. Collar 22 alternatively provides an anchor point for additional hoop wires. Such wires can slide or retract through slots in the collar.

The hoop wires (retractable ties 26) are preferably made of such a material that they are bendable into a hoop but yet stiff enough that when enveloping the upper portion of a plant they offer proper support. As previously mentioned the hoop size can be adjusted as necessary to support various width plants and yet can be reformed to push back into the upper tube for storage or making the hoop smaller.

The described garden stake readily accommodates different soil conditions. It is easily adjustable in height to be appropriate for different height plants. Moreover it accommodates the plant in terms of width and height as the plant grows. The stake is reconfigurable to perform these functions in a more favorable manner.

Other uses for stakes with adjustable feet and or length adjustment are contemplated for various applications in addition to garden stakes such as for fence posts. The adjustable foot or feet idea can be used to drive in a stake to considerable depth by readjusting the foot several times as the stake goes deeper. A person jumping on the foot or feet and/or even a slide hammer weight guiding on the stake shaft represents two possible applications of this idea.

Other spring configurations can be utilized to accomplish a locking friction mechanism securing the foot to any desired position along the stake shaft.

Although the description and accompanying drawings show the round tubing, it does not preclude the use of other shapes.

Thus, while the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined by reference to the claims that follow.

The embodiments of the invention in which an exclusive property or privilege is claimed are defined as follows:

1. A stake for insertion in soil to support an item, the stake comprising:
   a primary shaft having an upper end and a lower end configured for insertion into the soil at a first location; and
   a foot adjustably secured to said primary shaft, wherein said foot is adjustable and securable at multiple locations along at least a portion of said primary shaft, wherein said foot is slidably coupled to the exterior of said primary shaft, said foot being translatable along said primary shaft, and wherein said foot includes a leaf spring clamp having at least one hole for engagement of said primary shaft and being biased into an angled relationship with respect to said primary shaft.

2. The stake of claim 1, wherein said foot further includes a sleeve fixed to said supporting protrusion, said sleeve having an inner size slightly larger than an outer size of at least a portion of said primary shaft, said sleeve being slidably engaged to said primary shaft, said sleeve being positioned adjacent said leaf spring clamp.

3. The stake of claim 1, wherein said foot includes a support member substantially transverse to said lower end of said primary shaft, said support member extending between said primary shaft and said supporting protrusion.

4. The stake of claim 1, wherein said foot includes a sleeve fixed to said supporting protrusion, said sleeve having an inner size slightly larger than an outer size of at least a portion of said primary shaft, said sleeve being slidably engaged to said primary shaft.

5. The stake of claim 4, wherein said sleeve is cylindrical with and axis along a longitudinal axis of the primary shaft, said foot being rotatable about the primary shaft while maintaining the orientation of said supporting protrusion relative to said lower end of said primary shaft.

6. The stake of claim 1, wherein the leaf spring clamp includes at least one opening through which said primary shaft extends, said leaf spring clamp securing said foot longitudinally relative to said primary shaft.

7. The stake of claim 1, further comprising a secondary shaft telescopically secured to said primary shaft to adjustably slide along a longitudinal axis of said primary shaft for lengthening or shortening of the stake.

8. The stake of claim 7, further comprising a collar secured to at least one of said primary shaft and said secondary shaft, said collar providing an anchor point for additional securement of an item to be held by the stake.

9. The stake of claim 7, further comprising a quick-release fastener secured between said primary shaft and said secondary shaft.

10. The stake of claim 9, wherein said quick-release fastener includes a spring clamp.

11. The stake of claim 10, wherein said spring clamp comprises a leaf spring having openings for engagement of said primary shaft and said secondary shaft.

12. The stake of claim 7, further comprising a retractable support member extendably held within said secondary shaft, said retractable support member being slidably held within said secondary shaft and extendable from said secondary shaft for supporting an item to be held by the stake.

13. The stake of claim 12, wherein said retractable support member includes two flexible members each having outer ends with inter-locking hooks for engagement together.

14. The stake of claim 13, wherein said flexible members comprise wire.

15. The stake of claim 1, wherein said foot comprises a supporting protrusion for insertion into the soil at a second location removed from the first location.

16. The stake of claim 15, wherein said supporting protrusion maintains a substantially parallel orientation relative to said lower end of said primary shaft when said foot is translated along said primary shaft.

17. A stake for insertion in soil to support an item, the stake comprising:
   a primary shaft having an upper end and a lower end configured for insertion into the soil at a first location; and
   a foot configured to be adjustable and securable at multiple locations along at least a portion of the primary shaft, and the foot having at least one foot support member extending substantially transverse to the primary shaft such that the foot support member supports a user's body weight to help drive the stake into the soil.

18. The stake of claim 17, wherein the foot includes a locking friction mechanism operable to secure the foot at a desired position along the primary shaft.

19. The stake of claim 17, wherein at least a portion of the foot is configured to be insertable into the soil after the stake has penetrated the soil by a desired depth.

* * * * *